(12) United States Patent
Nachum (10) Patent No.: US 11,063,773 B1
(45) Date of Patent: Jul. 13, 2021

(54) METHOD AND APPARATUS FOR POWER OVER ETHERNET

(71) Applicant: MARVELL ISRAEL (M.I.S.L) LTD., Yokneam (IL)

(72) Inventor: Gai Nachum, Tel Aviv (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 268 days.

(21) Appl. No.: 16/263,817

(22) Filed: Jan. 31, 2019

Related U.S. Application Data (60) Provisional application No. 62/627,108, filed on Feb. 6, 2018.

(51) Int. Cl.
| | |
|---|---|
| *G06F 1/32* | (2019.01) |
| *H04L 12/10* | (2006.01) |
| *G06F 1/3215* | (2019.01) |
| *G06F 1/26* | (2006.01) |
| *G06F 1/3234* | (2019.01) |
| *G06F 1/3296* | (2019.01) |

(52) U.S. Cl.
CPC ............ *H04L 12/10* (2013.01); *G06F 1/266* (2013.01); *G06F 1/3215* (2013.01); *G06F 1/3253* (2013.01); *G06F 1/3296* (2013.01)

(58) Field of Classification Search
CPC ...................................... G06F 1/32; G06F 9/44
See application file for complete search history.

(56) References Cited

U.S. PATENT DOCUMENTS

| | | | | |
|---|---|---|---|---|
| 2014/0340075 | A1* | 11/2014 | Doi | G01R 21/00 324/113 |
| 2015/0077787 | A1* | 3/2015 | Nishimura | G06F 3/1236 358/1.14 |
| 2015/0172023 | A1* | 6/2015 | Yang | H04L 1/1854 370/329 |
| 2015/0244536 | A1* | 8/2015 | Ma | G06F 1/263 713/300 |
| 2019/0044369 | A1* | 2/2019 | Lin | H02J 9/06 |
| 2020/0329385 | A1* | 10/2020 | Lagnado | H04W 48/16 |

* cited by examiner

*Primary Examiner* — Keshab R Pandey (57) ABSTRACT

Aspects of the disclosure provide a network device that includes a plurality of network ports, a power management controller and port controllers. The plurality of network ports is configured to respectively couple external devices with the network device via network cables, and provide power to the external devices via the network cables. The power management controller is configured to allocate power to the external devices following a power allocation order that is sorted according to power priorities of the external devices. A port controller detects an external device coupled to a particular network port having an operational error. In response to the error detection, the port controller assigns an error priority that is lower than regular power priorities to the external device. The regular priorities are assigned to external devices without the operational error. Further, the port controller provides the error priority to the power management controller for power allocation.

20 Claims, 4 Drawing Sheets

METHOD AND APPARATUS FOR POWER OVER ETHERNET

INCORPORATION BY REFERENCE

This present disclosure claims the benefit of U.S. Provisional Application No. 62/627,108, "POWER OVER ETHERNET—POWER MANAGEMENT FOR FAULTY PORTS" filed on Feb. 6, 2018, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Power over Ethernet (PoE) technology allows local area network (LAN) devices to obtain power through the same data cable for network packet transmission. For example, an Ethernet cable is used to connect a power sourcing equipment (PSE) and a powered device (PD). The Ethernet cable includes multiple pairs of wires, and the PSE can inject power into one pair of wires that are is used for network packet transmission. Then, the PD receives the injected power from the Ethernet cable that is also used for network packet transmission.

SUMMARY

Aspects of the disclosure provide a network device that includes a plurality of network ports and a power management controller. The plurality of network ports is configured to respectively couple external devices with the network device via network cables, and provide power to the external devices via the network cables. The power management controller is configured to allocate power to the external devices following a power allocation order that is sorted according to power priorities of the external devices. The network device includes a port controller that is configured to detect an external device coupled to a particular network port having an operational error. In response to the error detection, the port controller assigns an error priority that is lower than regular power priorities to the external device having the operational error. The regular priorities are assigned to the external devices without the operational error. Further, the port controller provides the error priority to the power management controller for power allocation.

In an example, the power management controller is configured to allocate power to the particular network port with the error priority when extra power is available after power allocation for other network ports.

In some embodiments, the port controller is configured to assign an initial power priority of the external device based on attributes of the external device that is coupled to the particular network port. In an example, the initial power priority is higher than the error priority. In an embodiment, the port controller is configured to assign the error priority that is lower than the initial power priority in response to the error detection.

In some embodiments, the port controller is configured to restore the power priority of the particular network port based on attributes of the external device when the operational error is no longer detected.

In some examples, the port controller is configured to stop providing power to the particular network port in response to the detection of the operational error.

In an embodiment, the port controller is configured to start an error-timer with a preset delay time to delay a power-up to the external device.

Aspects of the disclosure provide a method for power allocation by a network device. The method includes detecting a first external device coupled to a first network port of the network device having an operational error and assigning, in response to the error detection, an error priority that is lower than regular power priorities to the first external device for power allocation. The regular power priorities are assigned to external devices without the operational error. Then, the method includes sorting the first network port and other network ports that are coupled with other external devices in a power allocation order based on the error priority of the first external device and power priorities of the other external devices. Further, the method includes allocating power to the first network port and the other network ports according to the power allocation order.

Aspects of the disclosure provide a network device that includes a plurality of network ports, a power apply and a power management controller. The plurality of network ports is configured to respectively couple external devices with the network device via network cables. The power supply is configured to provide power to the network ports for power delivery to the external devices via the network cables. The power management controller is configured to allocate power to the external devices following a power allocation order that is sorted according to power priorities of the external devices and control the power supply to provide power to the network ports according to the power allocation. The network device also includes a port controller configured to detect an external device coupled to a particular network port having an operational error, and in response to the error detection, assign an error priority that is lower than regular power priorities to the external device. The regular power priorities are assigned to the external devices without the operational error. Then, the port controller provides the error priority to the power management controller for power allocation.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide a network device that supplies power to external devices that are coupled to network ports of the network device via network cables. The network device allocates power to the external devices following an order that is sorted according to power priorities of the external devices. The network device then provides allocated power to the external devices via the network cables. Generally, power priorities are assigned to the external devices based on device attributes. The power priorities that are based on the device attributes are referred to as regular power priorities. The network device assigns a new power priority that is lower than the regular power priority to a specific external device that is coupled to a network port when an operational error associated with the specific external device is detected at the network port. The new power priority is referred to as error priority. When the network device has extra power (also referred to as free power) after power allocation to other external devices, the network device provides power to the network port to power up the specific external device.

Figure 1:
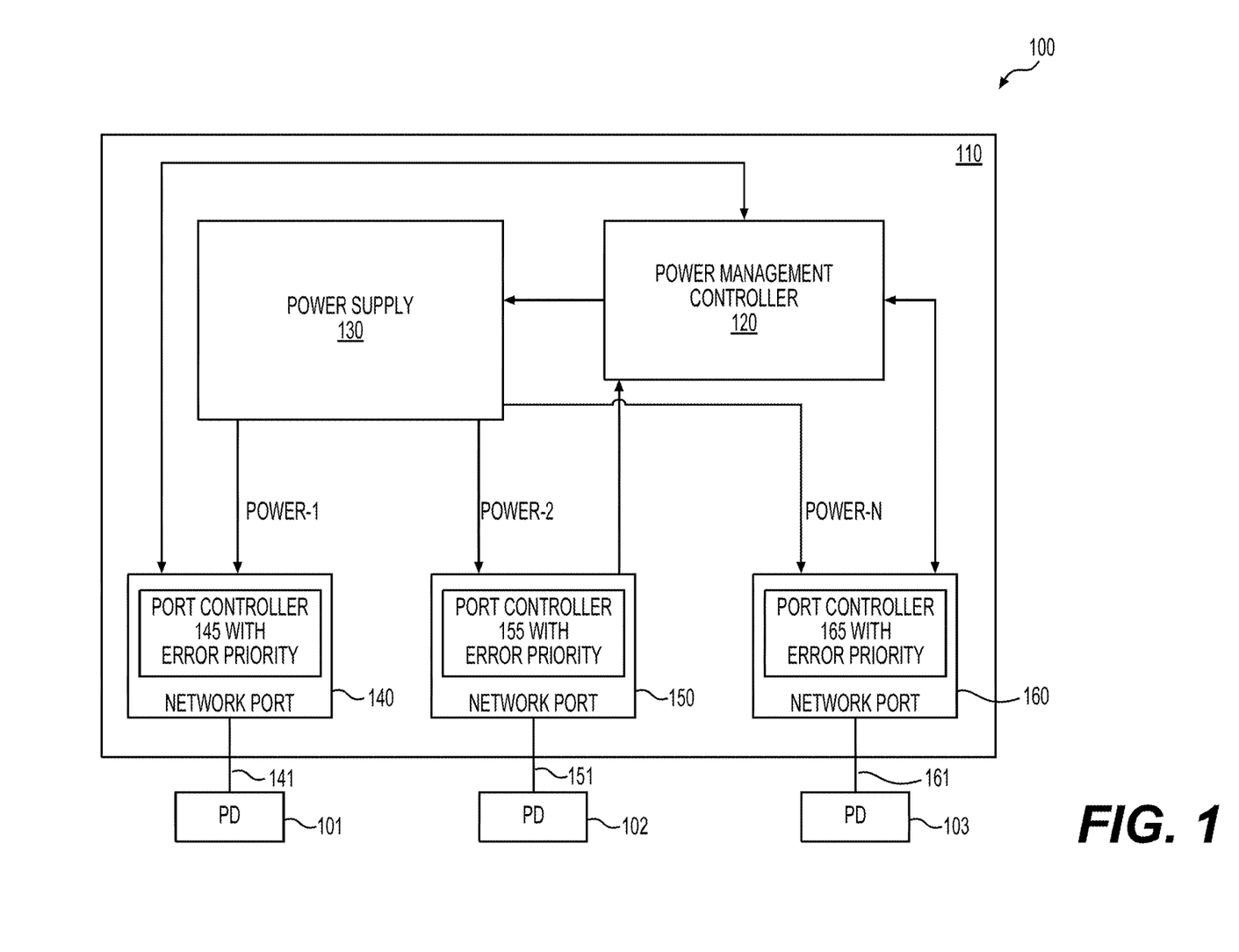
FIG. 1 shows a block diagram of a network system 100 according to an embodiment of the disclosure.

FIG. 1 shows a block diagram of a network system 100 according to an embodiment of the disclosure. In the network system 100, a network device 110 includes a plurality of network ports, such as network ports 140, 150 and 160. The network ports 140, 150 and 160 are coupled with external devices, such as external devices 101-103, and the like via network cables, such as network cables 141, 151 and 161 for data packet transmission. In addition, the network device 110 is configured to be able to provide power to compatible devices over the network cables. The network device 110 is also referred to as power sourcing equipment (PSE), and a compatible device is referred to as a powered device (PD). For example, the external devices 101-103 are compatible devices that receive power and perform data transmission via the same network cables 141, 151 and 161, and the network device 110 provide power to the external devices 101-103 via the network cables 141, 151 and 161.

It is noted that in some implementations the network device 110 is coupled with some external devices (not shown) that only perform data transmission via network cables, and receive power from separate power cables, such that some external devices are powered and some external devices are not powered.

While three network ports and three external devices are shown in FIG. 1, it is noted that the network device 110 can include more or fewer network ports that can be connected to more or fewer external devices.

According to an aspect of the disclosure, the network device 110 allocates power to the network ports 140, 150 and 160 to supply power to the external devices 101-103 following a power allocation order that is sorted according to power priorities of the external devices 101-103. The network device 110 assigns the error priority to a specific external device coupled to a network port in response to detecting an operational error associated with the specific external device at the network port. Then, in response to detecting an operational error, the error priority is used, along with respective power priorities of other powered devices (PD) in order to allocate power by the network device 110 to the powered devices (PD).

The network device 110 can be any suitable network device, such as a network switch, a network bridge, a router, a modem, a network hub, and the like. In an example, the network device 110 is an Ethernet switch that is configured to perform data packet forwarding in a local area network (LAN) according to an Ethernet standard. Then, the network ports 140, 150 and 160 are Ethernet ports that can mechanically and electrically couple with Ethernet cables.

In an embodiment, the external devices 101-103 are any suitable devices, such as a voice over Internet protocol (VoIP) phone, an access port (AP), a surveillance camera, another network switch, and the like that have an interface for the network cables 141, 151 and 161.

The network cables 141, 151 and 161 are any suitable network cables that each includes multiple pairs of wires, among which one pair of the wires is suitable to be used for power delivery. In an example, the network cables 141, 151 and 161 are Ethernet cables. Each Ethernet cable includes four pairs of wires. In an example, two pairs are used for data transmission, and then one of the other pairs is used for power delivery. For example, a first pair is used for transmitting a pair of differential signals that carry data packets out of the network device 110, a second pair is used for transmitting a pair of differential signals that carry data packet into the network device 110, and a third pair is used for supplying power from the network device 110 to powered devices (PD). In another example, the network device 110 injects power into the first pair of wires in the common mode to supply power out of the network device 110, and the common mode power has little or no influence to the data signals in the differential form, for example because of electro-magnetic interference.

According to an aspect of the disclosure, the network device 110 is configured to be a power source for compatible external devices, and allocates power to the compatible external devices. Specifically, in the FIG. 1 example, the network device 110 includes a power supply 130 (internal of network device 110) and a power management controller 120 that are coupled together and are coupled to the network port 140, 150 and 160. The power supply 130 is fed from an external power source (not shown), such a wall outlet for power supply, an uninterruptible power supply (UPS), and the like. The power supply 130 provides power to the network device 110 and to the compatible external devices. The maximum power that can be allocated from the power supply 130 to the compatible external devices is referred to as a system available power. The power supply 130 provides power to the network ports 140, 150 and 160 under control of the power management controller 120.

The power management controller 120 is configured to allocate power to the external devices based on respective power requirements and power priorities of the external devices. In an example, the power management controller 120 receives a power requirement, and a power priority for an external device from a network port with which the external device is connected. For example, when the network cable 141 connects the external device 101 with the network port 140, the network port 140 detects that a powered device (PD) is connected with the network device 110. When the network device 110 has sufficient available power to meet the maximum power needed to power a PD, the power supply 130 supplies the maximum power (referred to as an initial power allocation) to the network port 140 to power up the external device 101. When the external device 101 is powered up, the external device 101 sends device information (e.g., attributes) that is indicative of the power requirement and the power priority to the network device 110. Then, the network device 110 allocates power to the external device 101 according to its power requirement and the power priority.

In some embodiments, the power priority is determined based on attributes of the external device. In an example, the external device 101 is assigned one of a critical priority, a high priority and a normal priority as the power priority based on attributes of the external device 101. In an example, the critical priority, the high priority and the normally priority are referred to as regular power priorities. The critical priority is higher than the high priority and the normal priority, and the high priority is higher than the normal priority. For example, when the external device 101 is a surveillance camera, a critical priority is assigned to the external device 101; when the external device 101 is an access point (AP), a high priority is assigned to the external device 101; and when the external device 101 is a VoIP phone, a normal priority is assigned to the external device 101.

Further, according to an aspect of the disclosure, a minimum power priority, that is referred to as an error priority, is introduced. The error priority is lower than any of the critical priority, the high priority and the normal priority. The error priority is assigned to an external device when an error is detected at the network port where the external device is connected.

In the FIG. 1 example, each network port includes a port controller that is able to assign error priority to the connected external device in response to an operational error detection associated with the connected external device. Specifically, the network port 140 includes a port controller 145, the network port 150 includes a port controller 155, and the network port 160 includes a port controller 165. In the following description, the port controller 145 is described as an example, and other port controllers, such as the port controllers 155 and 165, are configured in the same manner as the port controller 145 in an example.

According to an aspect of the disclosure, the port controller 145 is configured to assign the error priority to (for example, minimize the power priority of) the external device 101 in response to an operational error associated with the external device 101. In some examples, the port controller 145 detects misbehavior by the external device 101 during operation, and minimizes the power priority of the external device 101 in response to the detection of misbehavior. For example, a resistance of the wires for power delivery is measured (e.g., periodically or in response to certain triggers) during operation, and provided to the port controller 145. When the port controller 145 detects that the resistance is out of a range for good behavior (e.g., caused by a short in the external device 101 during operation), the port controller 145 determines that the external device 101 misbehaves and has an error. The port controller 145 then minimizes the power priority of the external device 101. For example, the port controller 145 assigns the error priority to the external device 101 and informs the power management controller 120 that the external device 101 has the error priority.

When the power priority of the external device 101 is minimized, the power management controller 120 sorts the external device 101 to the last position in a power allocation order of external devices (or connected network ports) for power allocation. Thus, when the network device 110 has extra power after allocating power to other external devices that are ahead of the external device 101 in the power allocation order, the power management controller 120 then allocates power to the external device 101, thus the negative influence of the error device (e.g., the external device 101) to the operations of other external devices can be reduced. The negative influence will be described in detail in a related example.

In an example, the external device 101 is a surveillance camera, the external device 102 is a VoIP phone, and the external device 103 is an AP. The network device 110 has sufficient power to fully power up two of the external devices 101-103, but not all of them.

During normal operation, the network port 140 reports the critical priority to the power management controller 120, the network port 150 reports the normal priority to the power management controller 120 and the network port 160 reports the high priority to the power management controller 120. The power management controller 120 sorts the network ports in a sequence of the network port 140, the network port 160, and the network port 150 according to the power priorities. Then, the power management controller 120 controls the power source 130 to provide power to the network port 140 and the network port 160 to drive the external device 101 and the external device 103.

Further, when the port controller 145 detects an error associated with the external device 101, the port controller 145 assigns the error priority to the external device 101, and the network port 140 reports the error priority to the power management controller 120. The power management controller 120 sorts the network ports in a power allocation order of the network port 160, the network port 150, and the network port 140 according to the power priorities. Then, the power management controller 120 controls the power source 130 to continue providing power to the network port 160 to drive the external device 103 and controls the power source 130 to provide power to the network port 150 to drive the external device 102. Then the external device 103 and the external device 102 are kept powered-up without interruption.

Further, when the external device 102 is unplugged in an example, the network port 150 enters an inactive mode and powers down. In this example, the network port 140 reports the error priority to the power management controller 120, and the network port 160 reports the high priority to the power management controller 120. The power management controller 120 sorts the network ports in a power allocation order of the network port 160 and the network port 140 according to the power priorities. Then, the power management controller 120 controls the power source 130 to continue providing power to the network port 160. The network device 110 has extra power after power allocation to the network port 160, and then the power management controller 120 controls the power source 130 to provide power to the network port 140. In an example, when the external device 101 is powered up without error for a time duration (e.g., in a scenario that the error is caused by a specific weather condition, such as rain), the port controller 145 restores the power priority for the external device 101 to the critical priority. When error is detected during the time duration, the port controller 145 maintains the error priority for the external device 101.

In a related example without adding the error priority, even when the external device 101 misbehaves, the network port 140 reports the critical priority to the power management controller 120. For example, the network port 150 reports the normal priority to the power management controller 120 and the network port 160 reports the high priority to the power management controller 120. The power management controller 120 sorts the network ports in a sequence of the network port 140, the network port 160, and the network port 150 according to the power priorities. The power management controller 120 controls the power supply 130 to provide power to the network port 140 and the network port 160. When the error associated with the external device 101 is detected, the power management controller 120 controls the power supply 130 to stop providing power to the network port 140. Then the network device 110 has enough power for the external device 102, and the power management controller 120 controls the power supply 130 to provide power to the network port 150 to drive the external device 102.

However, when the power management controller 120 sorts the network ports again in the related example, without the error priority the network port 140 would be ahead of the network port 160 and the network port 150 in power allocation. In order to allocate power to the network port 140, the power management controller 120 stops providing power to the network port 150 (the external device 102 is then powered down), and provides power to the network port 140 to power up the external device 101. When the error associated with the external device 101 is detected again, the power management controller 120 controls the power supply 130 to stop providing power to the network port 140 and to provide power to the network 150 to drive the external device 102. In the related example, the external device 102 is repetitively powered up and powered down, and the operation of the external device 102 is interrupted due to the repetitive power-down.

It is noted that the port controllers 145, 155 and 165 can be implemented by various techniques. In an example, the port controllers 145, 155 and 165 are implemented as circuits respectively in the network ports 140, 150 and 160. In another example, the port controllers 145, 155 and 165 are implemented as a processor executing software instructions.

In some embodiments, a state machine is respectively implemented in the port controllers 145, 155 and 165.

Figure 2:
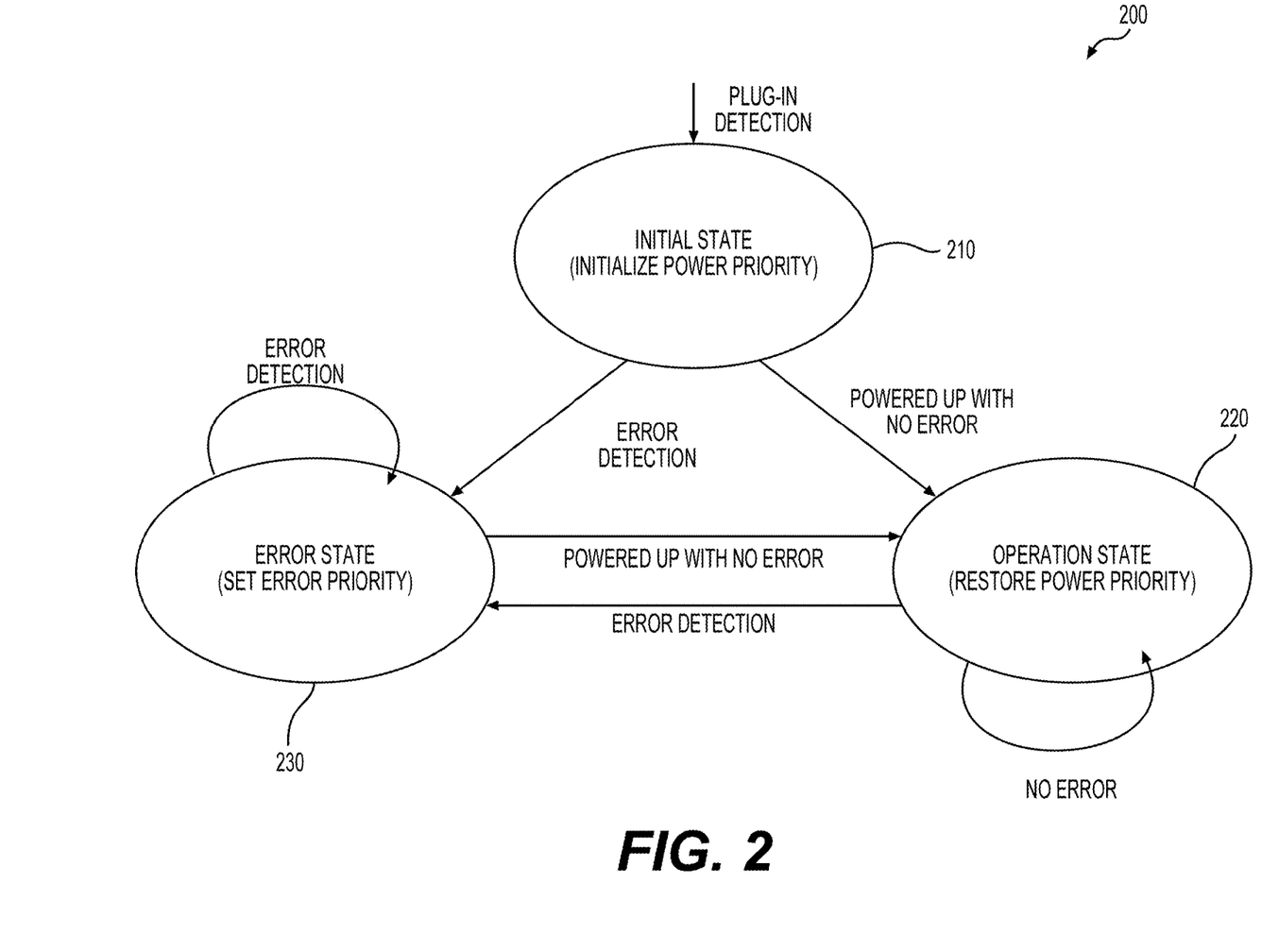
FIG. 2 shows a state diagram of a state machine 200 that is used in the network system 100 according to an embodiment of the disclosure.

FIG. 2 shows a simplified state diagram of a state machine 200 that is used in the network system 100 according to an embodiment of the disclosure. In an example, the state machine 200 is implemented in the port controller 145 at the network port 140. The state machine 200 can be implemented at the port controllers 155 and 165 in the similar manner.

The state machine 200 includes three states that are an initial state 210, an operation state 220 and an error state 230.

In an example, when the external device 101 is connected with the network port 140 via the network cable 141, the network port 140 detects the plug-in of the external device 101, and the state machine 200 enters the initial state 210. In an example, when the network device 110 has enough power for the maximum power to power a PD, the power supply 130 provides the maximum power (is referred to as an initial power allocation) to the network port 140 to power up the external device 101. When the external device 101 is powered up, the external device 101 sends device information that is indicative of the power requirement and the power priority to the network port 140. Then, the port controller 145 initializes the power priority based on the received device information.

In some embodiments, the power priority is determined based on attributes of the external device. For example, when the external device 101 is a surveillance camera, the port controller 145 determines the critical priority for the external device 101; when the external device 101 is an AP, the port controller 145 determines the high priority for the external device 101; and when the external device 101 is a VoIP phone, the port controller 145 determines the normal priority for the external device 101. The power priority and the power requirement of the external device 101 are provided from the network port 140 to the power management controller 120. The power management controller 120 then controls the power supply 130 to adjust the power to the network port 140 based on the power requirement and the power priority.

In the initial state 210, when the external device 101 is powered up with no error, the state machine 200 enters the operation state 220; otherwise, the state machine 200 enters the error state 230.

In the operation state 220, in an example, the power priority is determined based on attributes of the external device 101. The port controller 145 monitors wires for the power delivery in order to detect error associated with the external device 101. For example, the resistance of the wires for power delivery is measured (e.g., periodically or in response to certain trigger) in the operation state 220. When the port controller 145 detects that the resistance is out of a range for good behavior (e.g., caused by a circuit short in the external device 101 during operation), an error associated with the external device 101 is detected. When the error associated with the external device 101 is detected, the state machine 200 enters the error state 230; and when no error associated with the external device 101 is detected, the state machine 200 stays in the operation state 220.

In the error state 230, in an example, an error-timer is set with a delay time, such as 3 seconds, and starts running and no power is provided to the external device 101 before the error-timer expires. Further, in the error state 230, the port controller 145 then minimizes the power priority of the external device 101. For example, the port controller 145 assigns the error priority to the external device 101 and informs the power management controller 120 that the external device 101 has the error priority.

When the error-timer expires, and the network device 110 has sufficient power, power is provided to the external device 101 to drive the external device 101. If the external device 101 is powered up without error, the state machine 200 enters the operation state 220; otherwise, the state machine 200 stays in the error state 230.

It is noted that other suitable states can be added into the state machine 200. For example, an inactive state (not shown) can be added into the state machine 200. When unplug is detected at any of the initial state 210, the operation state 220 and the error state 230, the state machine 200 enters the inactive state.

Figure 3:
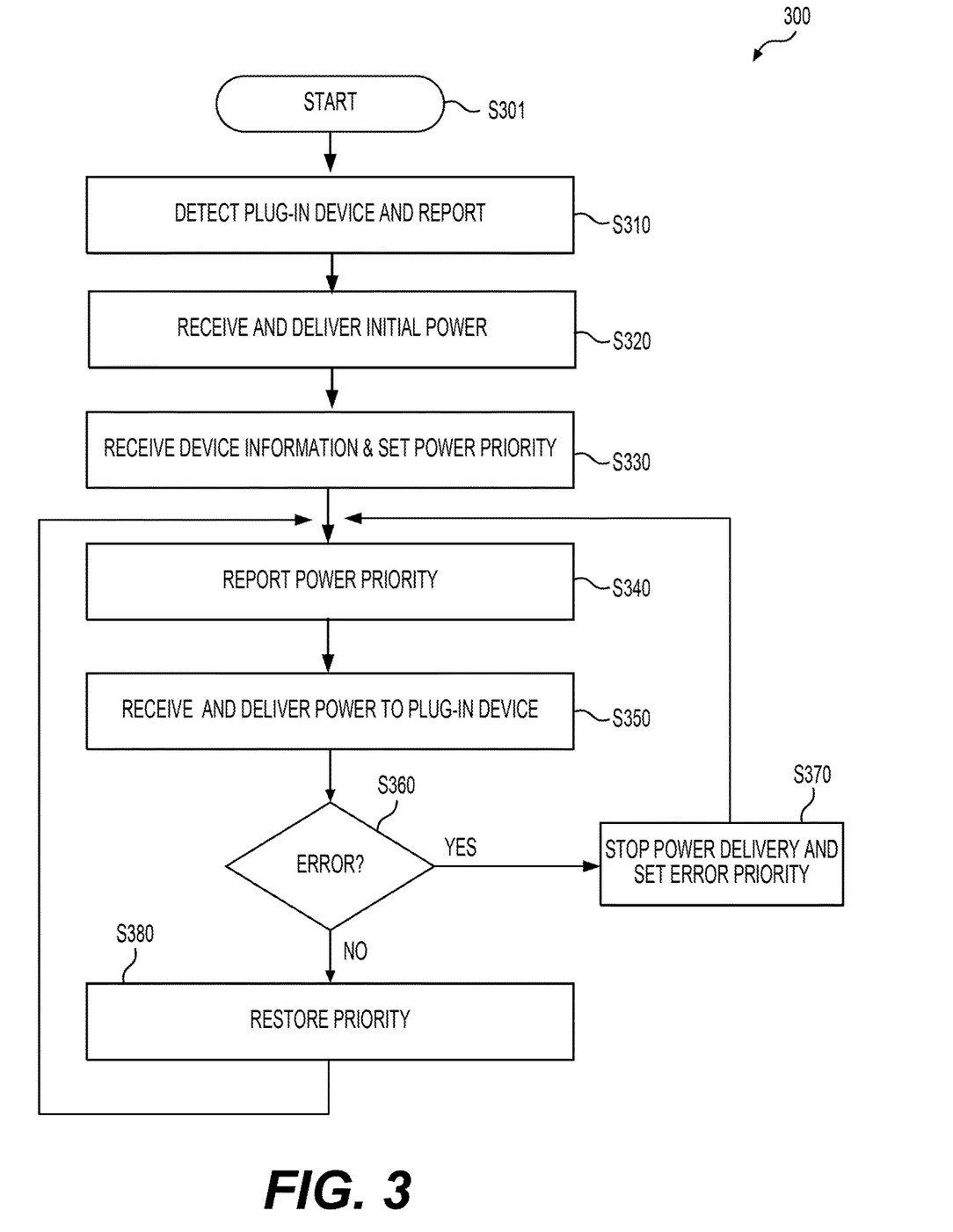
FIG. 3 shows a flow chart outlining a process example 300 that is used in the network system 100 according to an embodiment of the disclosure.

FIG. 3 shows a flow chart outlining a process example 300 that is used in the network system 100 according to an embodiment of the disclosure. In an example, the process 300 is executed by the port controller 145. It is noted that the process can be executed by other port controllers, such as the port controllers 155 and 165. The process starts at S301 and proceeds to S310.

At S310, a plug-in device is detected. In an example, when the external device 101 is connected with the network port 140 via the network cable 141, the port controller 145 receives a signal that is indicative of a detection of a plug-in device. The port controller 145 reports the plug-in event to the power management controller 120.

At S320, initial power is received and delivered to the plug-in device. In an example, when the network device 110 has enough free power for the maximum power to power a PD, the power supply 130 provides the maximum power to the network port 140, and the maximum power is delivered via the network cable 141 to the external device 101.

At S330, device information is received, and power priority is set according to the device information. In an example, when the external device 101 is powered up by the maximum power, the external device 101 sends device information that is indicative of the power requirement and the power priority to the network port 140. The port controller 145 receives the device information, and determines the power requirement and the power priority based on the device information. For example, when the external device 101 is a surveillance camera, the port controller 145 determines the critical priority for the external device 101; when the external device 101 is an AP, the port controller 145 determines the high priority for the external device 101; and when the external device 101 is a VoIP phone, the port controller 145 determines the normal priority for the external device 101.

At S340, the power priority and power requirement are reported to the power management controller 120. In an example, the port controller 145 sends the power priority and the power requirement to the power management controller 120.

At S350, power is received and provided to the plug-in device. In an example, the power management controller 120 then controls the power supply 130 to adjust the power to the network port 140 based on the power requirement and the power priority.

At S360, the port controller 145 monitors wires for the power delivery in order to detect error associated with the external device 101. For example, the resistance of the wires for power delivery is measured. When the port controller 145 detects that the resistance is out of a range for good behavior (e.g., caused by a circuit short in the external device 101 during operation), an error associated with the external device 101 is detected. When the error associated with the external device 101 is detected, the process proceeds to S370; otherwise, the process proceeds to S380.

At S370, the error associated with the external device 101 is detected, the port controller 145 stops power delivery to the external device 101 and minimizes the power priority. For example, the port controller 145 assigns the error priority to the external device 101. Then, the process returns to S340 to report the error priority to the power management controller 120.

At S380, no error is detected, the port controller 145 restores the power priority of the external device 101 based on the attributes of the external device 101. For example, when the external device 101 is a surveillance camera, the port controller 145 restores the power priority of the external device 101 to the critical priority; when the external device 101 is an AP, the port controller 145 restores the power priority of the external device 101 to the high priority; and when the external device 101 is a VoIP phone, the port controller 145 restores the power priority of the external device 101 to the normal priority. Then, the process returns to S340 to report the restored power priority to the power management controller 120.

In some examples, the power management controller 120 is configured to sort the network ports according to power priorities that are reported from the network ports and allocate power following the sorted order. Thus, in an embodiment, the port controller 145, 155 and 165 are implemented with an update that includes assigning the error priority in response to an (operational) error, and the power management controller 120 can remain the same and use the same algorithm.

Figure 4:
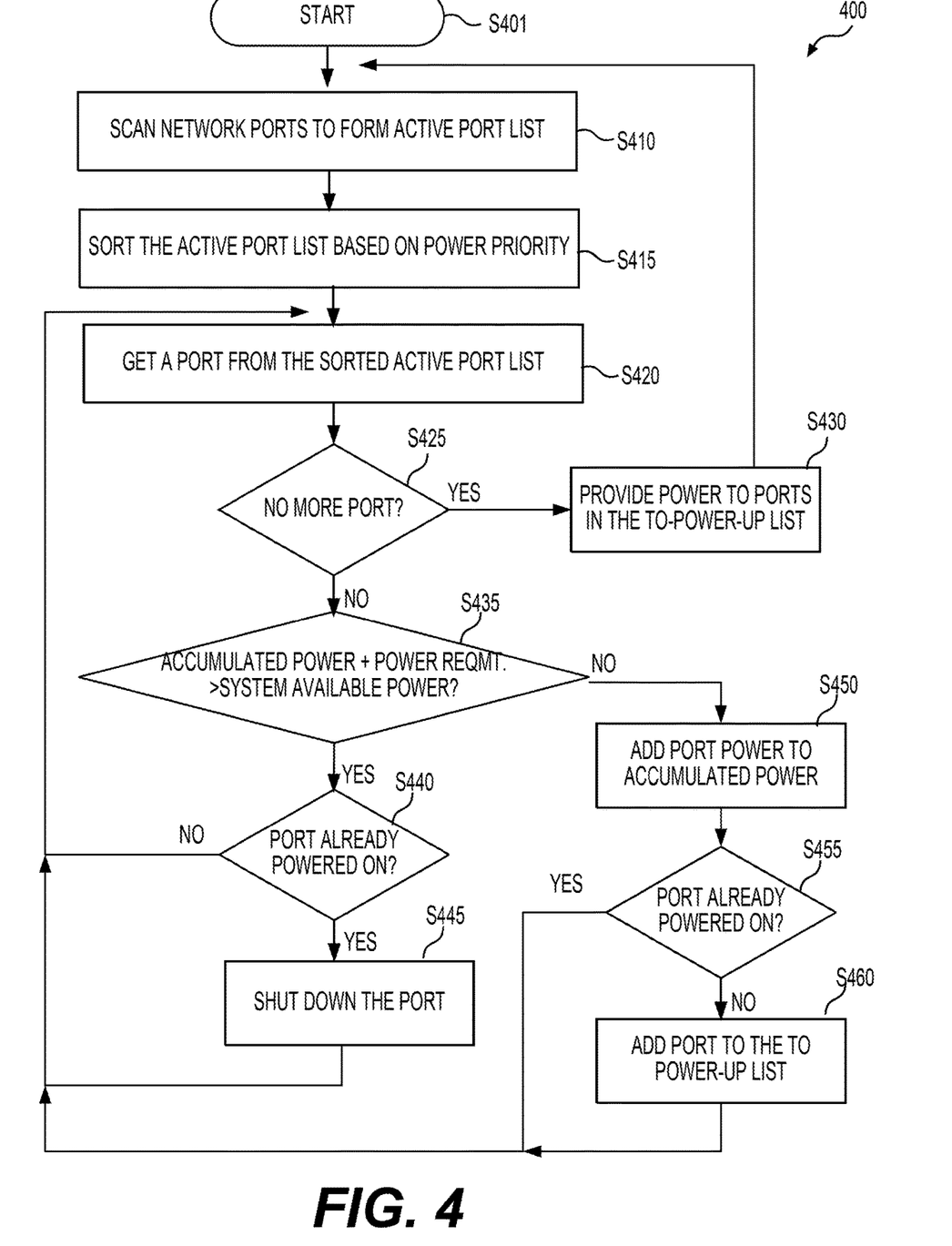
FIG. 4 shows a flow chart outlining a process example 400 that is used in the network system 100 according to an embodiment of the disclosure.

FIG. 4 shows a flow chart outlining a process example 400 that is implemented in the power management controller 120 according to an embodiment of the disclosure. The process starts at S401 and proceeds to S410.

At S410, the power management controller 120 scans the network ports to form an active port list. In an example, when a network port is in an inactive state or in a no-power-requirement state (e.g., the external device does not require power from the network cable) or has an effective (e.g., unexpired) error-timer, the power management controller 120 skips the network port; otherwise, the power management controller 120 adds the network port in the active port list and receives a report of power requirement and power priority from the network port.

At S415, the power management controller 120 sorts the network ports in the active port list based on power priorities. In an example, without error priority, the power management controller 120 sorts the network ports in a power allocation order based on critical priority, high priority and normal priority. When error priority is used, the power management controller 120 sorts the network ports in a power allocation order following critical priority, high priority, normal priority and error priority. It is noted that when two network ports have the same power priority, the network ports can be further sorted according to port identification in an example. In some embodiments, the power management controller 120 resets an accumulated power parameter to zero, and constructs a to-power-up list that is empty.

At S420, the power management controller 120 gets a port at the head of the sorted active port list.

At S425, when the sorted active port list is empty, the process proceeds to S430; otherwise, the process proceeds to S435.

At S430, the power management controller 120 controls the power supply 130 to provide power to the ports in the to-power-up list, and the process returns to S410.

At S435, the power management controller 120 calculates a sum of the accumulated power parameter and the power requirement of the port, and compares the sum to the system available power. When the sum is larger than the system available power, the process proceeds to S440; otherwise, the process proceeds to S450.

At S440, the network device 110 does not have enough power for the port, and the power management controller 120 determines whether the port is already powered on. When the port is already powered on, the process proceeds to S445; otherwise, the process returns to S420 to get a next port at the head of the sorted active port list.

At S445, the power management controller 120 controls the power supply 130 to stop providing power to the port and thus shuts down the port. Then, the process returns to S420 to get a next port at the head of the sorted active port list.

At S450, the power management controller 120 adds the power requirement of the port in the accumulated power parameter.

At S455, the power management controller 120 determines whether the port is already powered on. When the port is already powered on, the process returns to S420 to get a next port at the head of the sorted active port list; otherwise, the process proceeds to S460.

At S460, the power management controller 120 adds the port into the to-power-up list. Then, the process returns to S420 to get a next port at the head of the sorted active port list.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A network device, comprising:
a plurality of network ports configured to respectively couple external devices with the network device via network cables, and provide power to the external devices via the network cables;
a power management controller configured to allocate power to the external devices following a power allocation order that is sorted according to power priorities of the external devices, wherein the power priorities define an order of priority for providing power to the external devices that are connected to the network device via the network cables; and
a port controller configured to:
detect an external device coupled to a particular network port having an operational error;
in response to the error detection, assign an error priority that is lower than regular power priorities to the external device having the operational error, the regular priorities being assigned to the external devices that do not exhibit the operational error; and
provide the error priority to the power management controller for power allocation.

2. The network device of claim 1, wherein the power management controller is configured to allocate power to the particular network port with the error priority when extra power is available after power allocation for other network ports.

3. The network device of claim 1, wherein the port controller is configured to assign an initial power priority of the external device based on attributes of the external device that is coupled to the particular network port.

4. The network device of claim 3, wherein the initial power priority is higher than the error priority.

5. The network device of claim 3, wherein the port controller is configured to assign the error priority that is lower than the initial power priority in response to the error detection.

6. The network device of claim 1, wherein the port controller is configured to restore the power priority of the particular network port based on attributes of the external device when the operational error is no longer detected.

7. The network device of claim 1, wherein the port controller is configured to stop providing power to the particular network port in response to the detection of the operational error.

8. The network device of claim 1, wherein the port controller is configured to start an error-timer with a preset delay time to delay a power-up to the external device.

9. A method for power allocation by a network device, comprising:
allocating power to external devices according to power priorities of the external devices, wherein the power priorities define an order of priority for providing power to the external devices that are connected to the network device via network cables;
detecting a first external device coupled to a first network port of the network device having an operational error;
assigning, in response to the error detection, an error priority that is lower than regular power priorities to the first external device for power allocation, the regular power priorities being assigned to external devices that do not exhibit the operational error;
sorting the first network port and other network ports that are coupled with other external devices in a power allocation order based on the error priority of the first external device and power priorities of the other external devices; and
allocating power to the first network port and the other network ports according to the power allocation order.

10. The method of claim 9, further comprising:
allocating power to the first network port when extra power is available after power allocation to the other network ports.

11. The method of claim 9, further comprising:
assigning an initial power priority to the first external device based on attributes of the first external device.

12. The method of claim 11, wherein assigning the initial power priority to the first external device based on the attributes of the first external device further comprises:
assigning the initial power priority that is higher than the error priority to the first external device.

13. The method of claim 11, wherein assigning the initial power priority to the first external device based on the attributes of the first external device further comprises:
assigning, in response to the error detection, the error priority that is lower than the initial power priority to the first external device.

14. The method of claim 9, further comprising:
restoring a regular power priority of the first network port based on attributes of the first external device when the operational error is no longer detected.

15. The method of claim 9, further comprising:
stopping providing power to the first external device in response to the detection of the operational error.

16. The method of claim 9, further comprising:
starting an error-timer with a preset delay time to delay a power-up to the first external device.

17. A network device, comprising:
a plurality of network ports configured to respectively couple external devices with the network device via network cables;
a power supply configured to provide power to the network ports for power delivery to the external devices via the network cables;
a power management controller configured to allocate power to the external devices following a power allocation order that is sorted according to power priorities of the external devices and control the power supply to provide power to the network ports according to the power allocation, wherein the power priorities define an order of priority for providing the power to the external devices that are connected to the network device via the network cables; and
a port controller configured to:
detect an external device coupled to a particular network port having an operational error;
in response to the error detection, assign an error priority that is lower than regular power priorities to the external device, the regular power priorities being assigned to the external devices that do not exhibit the operational error; and
provide the error priority to the power management controller for power allocation.

18. The network device of claim 17, wherein the power management controller is configured to allocate power to the particular network port with the error priority when extra power is available after power allocation for other network ports.

19. The network device of claim 17, wherein the port controller is configured to assign an initial power priority to the external device based on attributes of the external device that is coupled to the particular network port.

20. The network device of claim 19, wherein the port controller is configured to assign the error priority that is lower than the initial power priority in response to the error detection.

* * * * *